United States Patent
Kim et al.

(10) Patent No.: US 9,671,847 B2
(45) Date of Patent: Jun. 6, 2017

(54) SEMICONDUCTOR DEVICE EMPLOYING CLOSED LOOP AND OPEN LOOP DVFS CONTROL AND SEMICONDUCTOR SYSTEM INCLUDING THE SAME

(71) Applicant: Samsung Electronics Co., Ltd., Suwon-si, Gyeonggi-do (KR)

(72) Inventors: Je-Kook Kim, Yongin-si (KR); Young-Hoon Lee, Seoul (KR); Min-Shik Seok, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 54 days.

(21) Appl. No.: 14/721,436

(22) Filed: May 26, 2015

(65) Prior Publication Data

US 2016/0116956 A1    Apr. 28, 2016

(30) Foreign Application Priority Data

Oct. 24, 2014    (KR) ........................ 10-2014-0145284

(51) Int. Cl.
*G06F 1/26*    (2006.01)
(52) U.S. Cl.
CPC ..................... *G06F 1/26* (2013.01)
(58) Field of Classification Search
None
See application file for complete search history.

(56) References Cited

U.S. PATENT DOCUMENTS

| | | | |
|---|---|---|---|
| 6,889,331 B2 | 5/2005 | Soerensen et al. | |
| 7,788,508 B1 | 8/2010 | Salmi et al. | |
| 8,046,601 B1 | 10/2011 | Paz et al. | |
| 8,151,125 B1 | 4/2012 | Hartman et al. | |
| 8,572,426 B2 | 10/2013 | Chan et al. | |
| 2007/0198870 A1 | 8/2007 | Cheng et al. | |
| 2011/0080202 A1 | 4/2011 | Moore et al. | |
| 2011/0215779 A1 | 9/2011 | Lee et al. | |
| 2011/0291730 A1* | 12/2011 | Ahn ........................ | H03K 5/135 327/276 |
| 2012/0242383 A1* | 9/2012 | Elad ......................... | H03L 7/06 327/156 |
| 2012/0297232 A1 | 11/2012 | Bircher | |
| 2013/0232346 A1 | 9/2013 | Wu | |
| 2013/0311792 A1 | 11/2013 | Ponnathota et al. | |
| 2015/0022272 A1* | 1/2015 | Felix ........................ | G06F 1/08 331/17 |

FOREIGN PATENT DOCUMENTS

KR    2009022662    3/2009

\* cited by examiner

*Primary Examiner* — Nitin Patel
(74) *Attorney, Agent, or Firm* — Onello & Mello LLP (57) ABSTRACT

In a semiconductor device for power management and a semiconductor system including the same, the semiconductor device includes an open loop source generator configured to generate an open loop source, an interface configured to output a dynamic voltage source (DVS) code based on the open loop source, a monitoring unit configured to receive a power supply voltage generated based on the DVS code as a feedback and generate a monitoring signal, and a phase difference measurement unit configured to compare the open loop source with the monitoring signal and set a hold time corresponding to an arithmetic period in a closed loop.

19 Claims, 8 Drawing Sheets

SEMICONDUCTOR DEVICE EMPLOYING CLOSED LOOP AND OPEN LOOP DVFS CONTROL AND SEMICONDUCTOR SYSTEM INCLUDING THE SAME

CROSS-REFERENCE TO RELATED APPLICATION

This application claims priority from Korean Patent Application No. 10-2014-0145284 filed on Oct. 24, 2014 in the Korean Intellectual Property Office, and all the benefits accruing therefrom under 35 U.S.C. 119, the contents of which in its entirety are herein incorporated by reference.

BACKGROUND

1. Field

The present inventive concepts relate to a semiconductor device for power management and a semiconductor system comprising the same.

2. Description of the Related Art

Recently, with development of portable and small-sized electronic devices, supplying power to an electronic device is becoming an important issue. In particular, with the progress of system-on-chip (SoC) technology in which an electronic device is integrated to a chip, power management integration may also increasingly be desired. In order to stably supply power to a low-power consuming mobile electronic system, such as a mobile phone, a portable multimedia player (PMP), a camera, or the like, a power management integrated circuit (PMIC) may be used.

Many circuits in an electronic device may require different power supply voltages. The power management integrated circuit may be connected with a battery to generate different power supply voltages. The power management integrated circuit may supply power to the electronic device using the different power supply voltages. In addition, the power management integrated circuit may reduce power consumption of the electronic device by adjusting a power supply voltage according to a driving state of the electronic device. As functionality of the power management integrated circuit continues to increase, the size and complexity of the power management integrated circuit may increase.

SUMMARY

The present inventive concepts provide a semiconductor device having a fast response speed and high stability.

The present inventive concepts also provide a semiconductor system having a fast response speed and high stability.

The present inventive concepts will be described in or be apparent from the following description of the preferred embodiments.

According to an aspect of the present inventive concepts, there is provided a semiconductor device including an open loop source generator configured to generate an open loop source, an interface configured to output a dynamic voltage source (DVS) code based on the open loop source, a monitoring unit configured to receive a power supply voltage generated based on the DVS code as a feedback and generate a monitoring signal, and a phase difference measurement unit configured to compare the open loop source with the monitoring signal and set a hold time corresponding to an arithmetic period in a closed loop.

According to another aspect of the present inventive concepts, there is provided a semiconductor device using a closed loop dynamic voltage and frequency scaling (DVFS). The semiconductor device includes a memory configured to store a hold time, an open loop controller configured to measure a latency on a closed loop using a phase signal and set the hold time based on the latency, and a closed loop controller configured to control the closed loop. The closed loop includes outputting a dynamic voltage source (DVS) code, receiving a first power supply voltage based on the DVS code as a feedback, determining an error between the fed-back first power supply voltage and a target value for each hold time, and changing the DVS code to compensate for the error.

According to still another aspect of the present inventive concepts, there is provided a semiconductor system including a processor and a power management integrated circuit configured to generate a power supply voltage under a control of the processor. The processor generates a phase signal, and supplies to the power management integrated circuit a first dynamic voltage source (DVS) code corresponding to the phase signal. The power management integrated circuit generates a first power supply voltage corresponding to the first DVS code, and provides a feedback. The processor generates a monitoring signal based on the fed back first power supply voltage, compares the monitoring signal with the phase signal, and sets a hold time corresponding to an arithmetic period in a closed loop.

BRIEF DESCRIPTION OF THE DRAWINGS

The above and other features and advantages of the present inventive concepts will become more apparent by describing in detail preferred embodiments thereof with reference to the attached drawings in which:

FIG. 1 is a block diagram of a semiconductor system according to some embodiments of the present inventive concepts;

FIG. 2 is a block diagram of a processor shown in FIG. 1;

DETAILED DESCRIPTION

Advantages and features of the present inventive concepts and methods of accomplishing the same may be understood more readily by reference to the following detailed description of preferred embodiments and the accompanying drawings. The present inventive concepts may, however, be embodied in many different forms and should not be construed as being limited to the embodiments set forth herein. Rather, these embodiments are provided so that this disclosure will be thorough and complete and will fully convey the concept of the inventive concepts to those skilled in the art, and the present inventive concepts will only be defined by the appended claims. Like reference numerals refer to like elements throughout the specification.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a block diagram of a semiconductor system according to some embodiments of the present inventive concepts and FIG. 2 is a block diagram of a processor shown in FIG. 1.

Referring to FIGS. 1 and 2, the semiconductor system 1 according to some embodiments of the present inventive concepts includes a processor 10 and a power management integrated circuit (PMIC) 20.

The PMIC 20 may be controlled by the processor 10, and may generate power supply voltages VDD1 and VDD2. For example, the processor 10 may control the PMIC 20 by dynamic voltage and frequency scaling (DVFS), thereby optimizing power utilization.

First, the processor 10 may set a hold time HT to be used in a closed loop based on the latency measured using an open loop. In detail, the processor 10 may generate an open loop source signal in order to supply a first dynamic voltage source (DVS) code DVS1 to the PMIC 20. The PMIC 20 may generate a first power voltage VDD1 based on the first DVS code DVS1, and may provide a feedback. The processor 10 may measure the hold time HT using an open loop source and the fed-back first power voltage VDD1.

Next, the processor 10 may set the hold time HT of the closed loop based on the measured latency. The processor 10 may control a level of a second power voltage VDD2 generated by the PMIC 20 using a closed loop method. In detail, the processor 10 may provide a second DVS code DVS2 to the PMIC 20. The PMIC 20 may generate the second power voltage VDD2 based on the second DVS code DVS2, and may provide a feedback. The processor 10 may measure an error between the fed-back second power voltage VDD2 and a target value for each set hold time HT, and may change the second DVS code DVS2 to compensate for the error. The PMIC 20 may readjust the second power voltage VDD2 based on the changed second DVS code DVS2.

To sum up, the processor 10 may set the hold time HT measured by the open loop method before the closed loop starts. Since the hold time HT is measured before the closed loop starts, the measured hold time may reflect a delay varying according to an application, a chip, a board or other environment. It is not necessary to unduly set the hold time HT so as to be suitable for all of variable environments. That is to say, since a tight and accurate hold time HT can be set, the overall response time may be decreased and the stability of the overall semiconductor system may be increased.

Referring to FIG. 2, the processor 10 may include a monitoring unit 110, an open loop controller 120, a closed loop controller 130, a memory 140, and an interface 150.

The open loop controller 120 may control the PMIC 20 by an open loop method. In detail, the open loop controller 120 may estimate or measure a latency on a closed circuit using an open loop source PS (for example, a phase signal), and may set a hold time HT based on the latency. The open loop controller 120 may set the hold time HT before closed loop operation starts.

A process of setting the hold time HT will now be described.

First, the open loop controller 120 may generate an open loop source PS. The open loop source PS may be a phase signal. For example, the phase signal may be a periodic signal or a non-periodic signal. The phase signal may include a sine wave signal, a triangle wave signal or a square wave signal.

The interface 150 may receive the open loop source PS, and may output a first DVS code DVS1. The interface 150 may include various types of interfaces, for example, an I2C interface.

The PMIC 20 may receive the first DVS code DVS1, and may generate a first power voltage VDD1 based on the first DVS code DVS1 within a specified range of power supply voltages.

The monitoring unit 110 may receive the first power voltage VDD1 generated from the PMIC 20 as a feedback, and may generate a monitoring signal MS. The monitoring unit 110 may include, for example, a hardware performance monitor (HPM). Here, the HPM may perform a monitoring operation for identifying an operating state of a system. The HPM may observe an electrical signal fed back from a measurement target system, and may measure an average instruction execution time, instruction emergence frequency, device usage ratio or program module operation counts in hardware. The HPM may allow dynamic measurement in a state in which the system is actually operated.

The open loop controller 120 may compare the open loop source PS with a monitoring signal MS. Since the open loop source PS is a phase signal, the monitoring signal MS may also be a phase signal. Therefore, a latency to be generated on the closed loop can be estimated by measuring a phase difference between the open loop source PS and the monitoring signal MS. The measuring of the phase difference will be described in detail with reference to FIGS. 5 to 7. Based on the measured phase difference, the open loop controller 120 may set a hold time corresponding to an arithmetic period and/or an update period in the closed loop to the memory 140.

After the hold time is set by an open loop method, the closed loop may start.

In some embodiments, the closed loop controller 130 may control the closed loop.

In detail, the closed loop controller 130 may control the interface 150 to output the second DVS code DVS2. The monitoring unit 110 may receive the second power voltage VDD2 generated based on the second DVS code DVS2 as a feedback. The closed loop controller 130 may measure an error between the fed-back second power voltage VDD2 and a target value for each pre-set hold time, and may output a change signal GS with the error reflected. The interface 150 may change the second DVS code DVS2 based on the change signal GS to compensate for the error.

In the semiconductor system according to some embodiments of the present inventive concepts, a total system phase margin can be measured using an open loop. That is to say, an open loop source PS, which is independent of a closed loop, may be generated. A delay value and a phase of a monitoring signal MS generated based on the open loop source PS, may be measured. A hold time HT, which is an arithmetic period in a closed loop, may be set. In such a manner, the hold time HT may be set based both on the delay value in the PMIC 20 and on a delay value which may be generated when the hold time HT is fed back from the PMIC 20 to the processor 10. Therefore, the hold time HT can be set more accurately.

Figure 3:
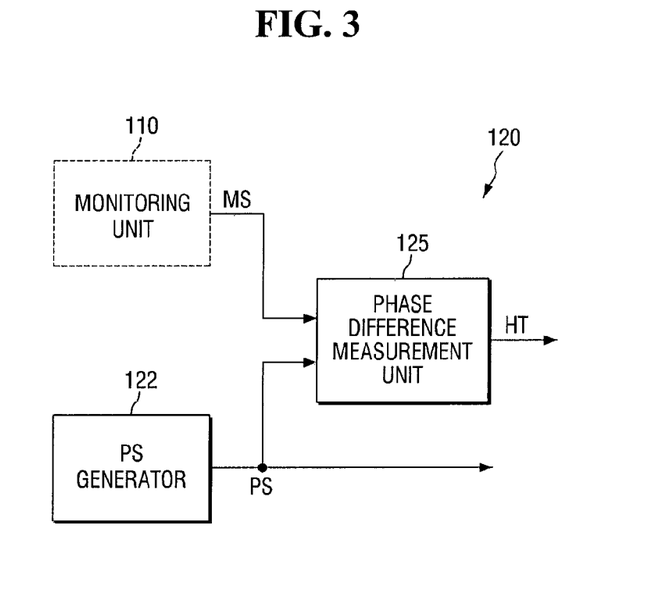
FIG. 3 is a block diagram of an open loop controller shown in FIG. 2.
Figure 4:
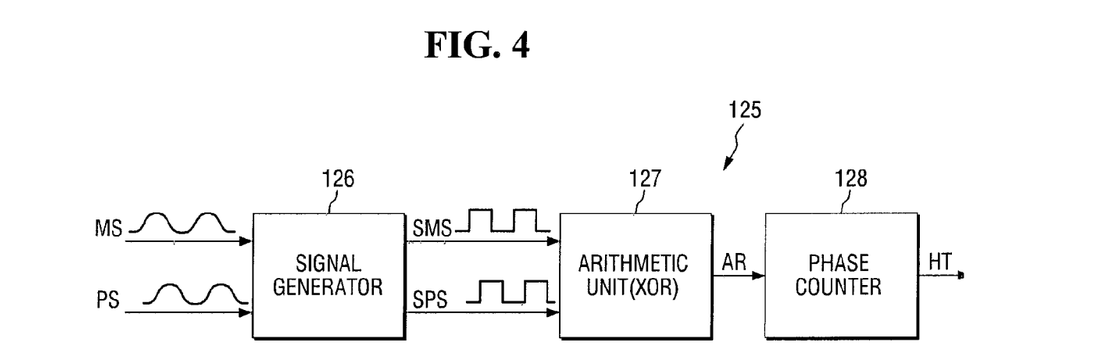
FIG. 4 is a block diagram of a phase difference measurement unit shown in FIG. 3.

FIG. 3 is a block diagram of an open loop controller shown in FIG. 2 and FIG. 4 is a block diagram of a phase difference measurement unit shown in FIG. 3.

First, referring to FIG. 3, the open loop controller 120 may include an open loop source generator 122 and a phase difference measurement unit 125.

The open loop source generator 122 may generate an open loop source PS. The open loop source PS may be a phase signal. The phase signal may include a sine wave signal, a triangle wave signal or a square wave signal.

The open loop source PS may not be necessarily a phase signal so long as it can measure the latency of the closed loop.

The phase difference measurement unit 125 may compare the open loop source PS with the monitoring signal MS, and may set the hold time HT corresponding to the arithmetic period in the closed loop. Referring to FIG. 4, the phase difference measurement unit 125 may include a signal generator 126, an arithmetic unit 127, and a phase counter 128.

The signal generator 126 may generate a sliced phase signal (or a sliced open loop source SPS) based on the phase signal (i.e., the open loop source PS), and may generate a sliced monitoring signal SMS based on the monitoring signal MS. Here, the sliced phase signal may be a square wave signal generated based on the phase signal, but is not limited thereto.

The arithmetic unit 127 may perform an arithmetic operation based on the sliced phase signal SPS and the sliced monitoring signal SMS. Here, the arithmetic operation may be an exclusive OR (XOR) operation.

The phase counter 128 may measure a phase difference between the phase signal (i.e., the open loop source PS) and the first power voltage VDD1 based on the arithmetic result (AR).

Figure 5:
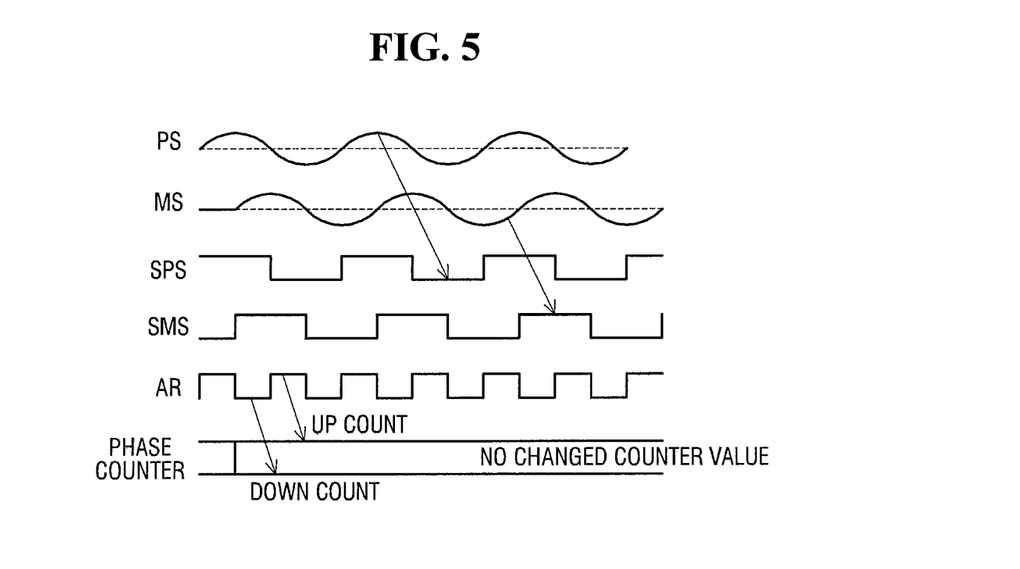
FIGS. 5 to 7 are block diagrams illustrating the operation of a phase difference measurement unit shown in FIGS. 3 and 4.
Figure 6:
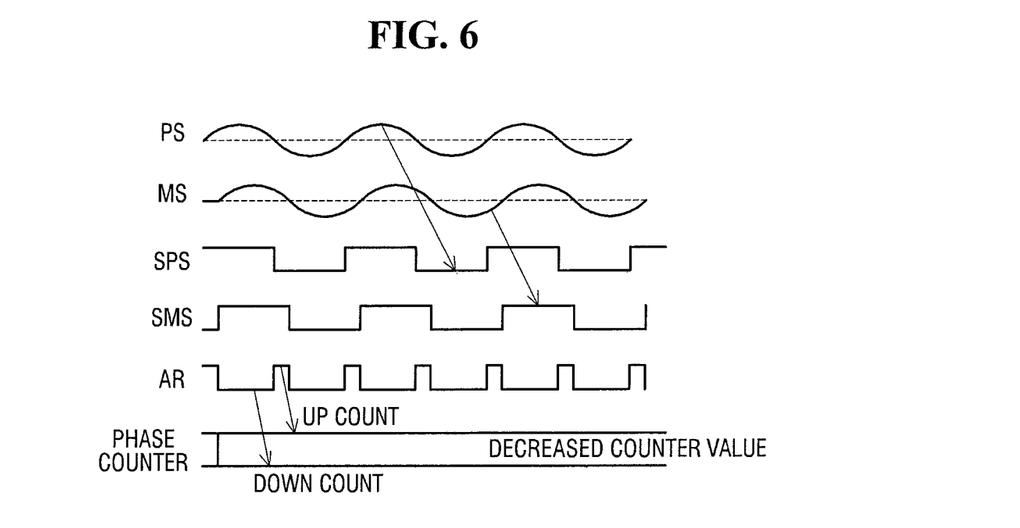
Figure 7:
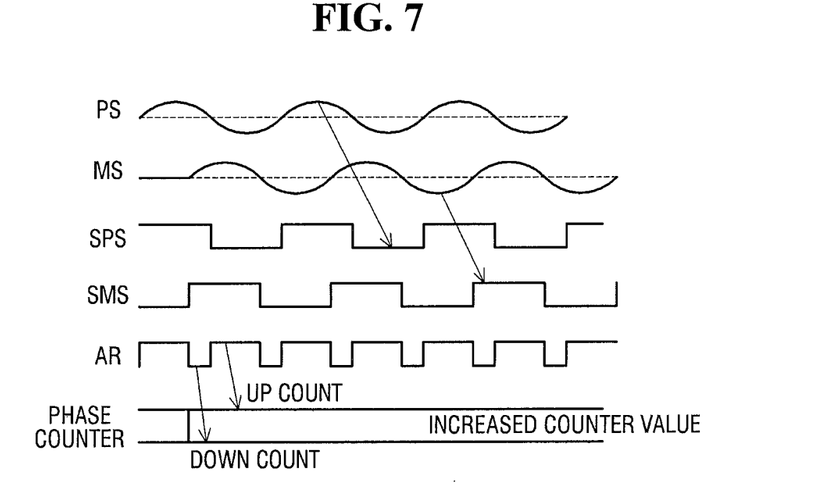

FIGS. 5 to 7 are block diagrams illustrating the operation of a phase difference measurement unit shown in FIGS. 3 and 4.

Referring to FIG. 5, there is a phase difference of 90° between the open loop source PS and the monitoring signal MS. Therefore, when an XOR operation is performed on the sliced open loop source SPS and the sliced monitoring signal SMS, a. duty ratio of an arithmetic result AR of the XOR operation may be 50%. That is to say, a ratio of logic high levels and logic low levels in the XOR arithmetic result AR may be 1:1. According to a reference clock (not shown), when the XOR arithmetic result AR of the arithmetic unit 127 has a logic low waveform, the phase counter 128 may be down counted to decrease a counter value. When the XOR arithmetic result AR of the arithmetic unit 127 has a logic high waveform, the phase counter 128 may up counted to increase the counter value. The reference clock may have a shorter period than the open loop source PS. Therefore, if the phase counter 128 is up/down counted by the reference clock, there may be no change in the counter value.

Referring to FIG. 6, there is a phase difference of 45° between the open loop source PS and the monitoring signal MS. Therefore, when an XOR operation is performed on the sliced open loop source SPS and the sliced monitoring signal SMS, a duty ratio of an arithmetic result AR of the XOR operation may be 25%. That is to say, a ratio of logic high levels and logic low levels in the XOR arithmetic result AR may be 1:3. Therefore, if the phase counter 128 is up/down counted by the reference clock, the counter value may be decreased.

Referring to FIG. 7, there is a phase difference of 135° between the open loop source PS and the monitoring signal MS. Therefore, when an XOR operation is performed on the sliced open loop source SPS and the sliced monitoring signal SMS, a duty ratio of an arithmetic result AR of the XOR operation may be 75%. That is to say, a ratio of logic high levels and logic low levels in the XOR arithmetic result AR may be 3:1. Therefore, if the phase counter 128 is up/down counted by the reference clock, the counter value may be increased.

Figure 8:
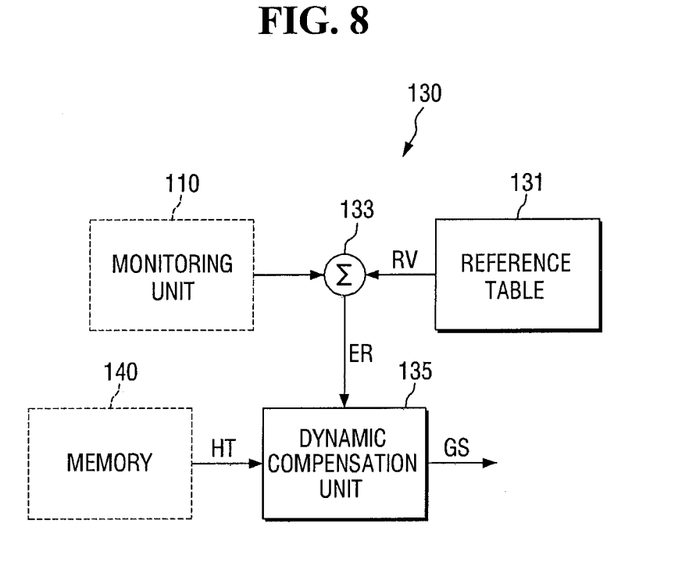
FIG. 8 is a block diagram of a closed loop controller shown in FIG. 2.

FIG. 8 is a block diagram of a closed loop controller shown in FIG. 2.

Referring to FIG. 8, the closed loop controller 130 may include a reference table 131, a calculation unit 133, and a dynamic compensation unit 135.

The target DVS code RV corresponding to a target value may be stored in the reference table 131. For example, the target DVS code RV may be stored as 50 in the reference table 131.

The closed loop controller 130 may provide the target DVS code RV to the PMIC 20, and the monitoring unit 110 may receive the second power voltage VDD2 generated in the PMIC 20 as a feedback signal.

According to characteristics of devices included in the PMIC 20, the second power voltage VDD2 may have a different level.

The calculation unit 133 may measure a difference ER between a target DVS code RV and a measured code. The measured difference ER may be provided to the dynamic compensation unit 135.

The dynamic compensation unit 135 may integrate or average multiple differences ER's provided during a hold period. A length of the hold period may be equal to the hold time that is set using the open loop method. It is necessary to discreetly change the second power voltage VDD2 generated from the PMIC 20. That is to say, in order to clarify whether the measured difference ER has been generated by a noise or whether the second power voltage VDD2 is in an abnormal range, the dynamic compensation unit 135 may integrate or average the multiple differences ER's for each hold time. An error between the fed-back second power voltage VDD2 and a target value may be determined based on a result of the integrating or averaging. In order to compensate for the error, the dynamic compensation unit 135 may output a change signal GS for changing a second DVS code.

In FIG. 8, the hold time used as an arithmetic period for determining the error between the fed-back second power voltage VDD2 and the target value may be exemplified. However, it is obvious to one skilled in the art that the hold time can be applied to another arithmetic period for determining another value in a closed loop.

Figure 9:
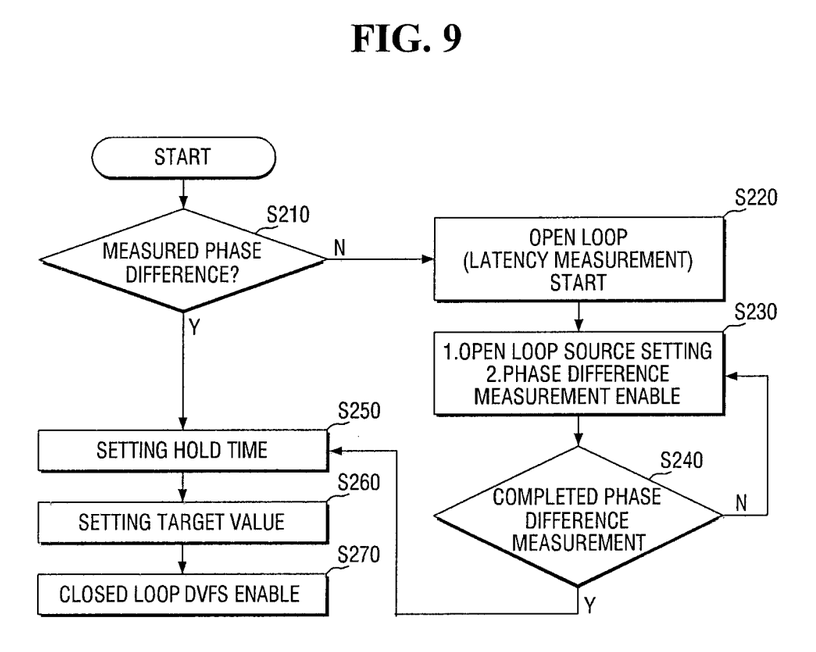
FIG. 9 is a flowchart illustrating a driving method of a semiconductor device according to some embodiments of the present inventive concepts.

FIG. 9 is a flowchart illustrating a driving method of a semiconductor device according to some embodiments of the present inventive concepts.

In the following description, substantially the same content as that described above with reference to FIGS. 1 to 8 will not be given.

Referring to FIG. 9, before a closed loop starts, it is determined whether there is a measured phase difference (S210).

If there is no measured phase difference, an open loop (that is, latency measurement) may start (S220). In detail, in step S230, an open loop source PS may be set. A first power voltage VDD1 generated based on the open loop source PS (i.e., the first DVS code DVS1) may be fed back. A monitoring signal MS may be generated based on the fed-back first power voltage VDD1. A phase difference between the open loop source PS and the monitoring signal MS may be measured. As described above with reference to FIGS. 5 to 7, the phase difference measurement may be enabled at 90°, 180°, 270° and 360° of a phase signal (i.e., a period signal). For example, the phase difference measurement may be enabled by counting a time difference between zero crossing points of the open loop source PS and the monitoring signal MS using a reference clock. The phase difference measurement unit 125 may repeatedly measure phase differences, and may output an average value of the repeatedly measured phase differences as the phase difference. The measured phase difference may be output as a hold time (HT) signal.

It is determined whether phase difference measurement has completed or not (S240). If not, the routine may go back to step S230. If phase difference measurement has completed, a hold time corresponding to an arithmetic period in a closed loop may be set (S250).

Next, a target value may be set (S260).

Next, the closed loop dynamic voltage and frequency scaling (DVFS) may start so that the second power supply voltage generated in the PMIC 20 can be suitable for the set target value. In the closed loop DVFS, an arithmetic operation may be performed for each set hold time.

Figure 10:
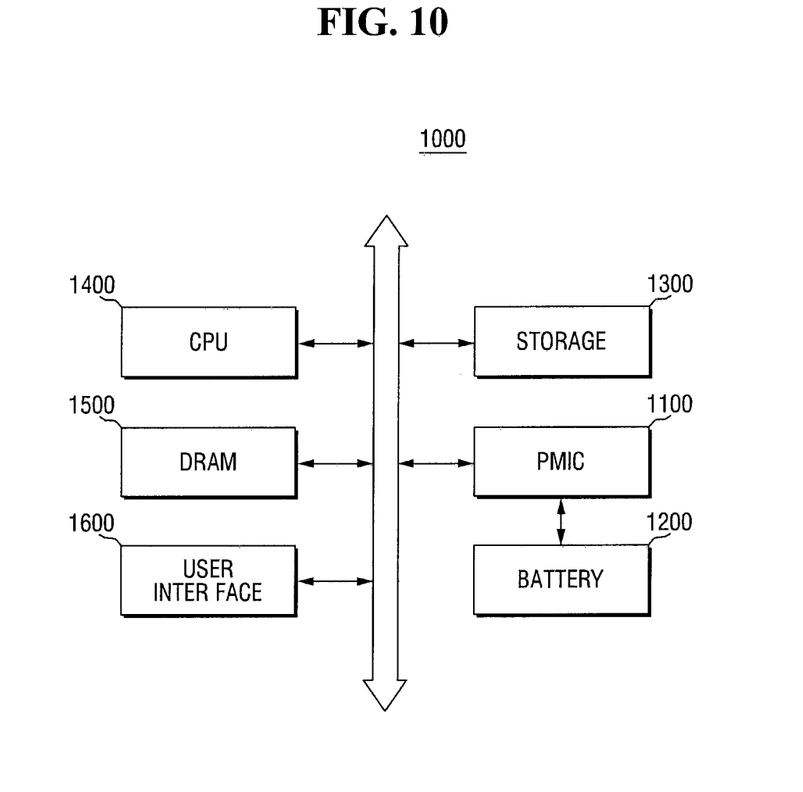
FIGS. 10 and 11 are diagrams of exemplary electronic devices employing a semiconductor device and a semiconductor system according to some embodiments of the present inventive concepts.
Figure 11:
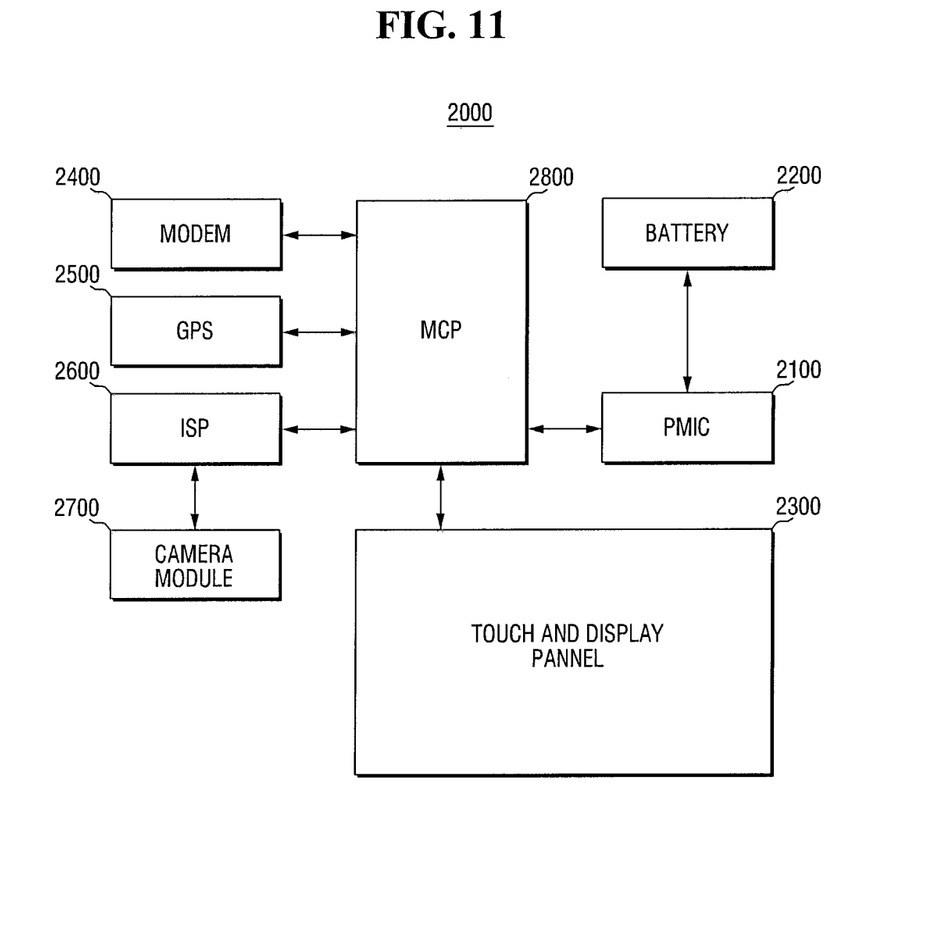

FIGS. 10 and 11 are diagrams of exemplary electronic devices employing a semiconductor device and a semiconductor system according to some embodiments of the present inventive concepts.

In detail, FIG. 10 is a block diagram illustrating an application example in which a semiconductor device and system according to some embodiments of the present inventive concepts are employed to an electronic device 1000. In FIG. 10, the electronic device 1000 may be implemented by a personal computer (PC) or a portable electronic device such as a notebook computer, a smart phone, a personal digital assistant (PDA), or a camera.

Referring to FIG. 10, the electronic device 1000 may include a power management integrated circuit (PMIC) 1100, a battery 1200, a storage 1300, a central processing unit (CPU) 1400, a dynamic random access memory (DRAM) 1500, and a user interface 2600.

As described above, the electronic device 1000 according to the present inventive concepts may compress and store data used in booting the PMIC 1100. The electronic device 1000 may decompress compressed code data in a hardware manner to use the same. The PMIC 1100 according to the present embodiment may have a reduced size and a reduced operating time. Therefore, the size of the electronic device 1000 may also be reduced and a booting time of the electronic device 1000 may be shortened.

FIG. 11 is a block diagram illustrating an application example in which a semiconductor device and system according to some embodiments of the present inventive concepts are employed to a smart phone 2000.

Referring to FIG. 11, the smart phone 2000 may include a power management integrated circuit 2100, a battery 2200, a touch and display panel 2300, a modem 2400, a global positioning system (GPS) 2500, an image signal processor (ISP) 2600, a camera module 2700 and a multi chip package (MCP) 2800.

The touch and display panel 2300 may include a touch panel for sensing a user's touch and a display panel for displaying an image. The touch panel may include a capacitance sensor.

The modem 2400 may connect a cellular network station, such as a global system for mobile communications (GSM), a universal mobile telephone system (UMTS), or a wideband code division multiple access (WCDMA). The modem 2400 may perform transmission/reception operations for voice communication and data communication.

The GPS 2500 may receive a GPS signal from a satellite, and may process the received data. The ISP 2600 may convert into digital data a light signal that is input from an image sensor incorporated in the camera module 2700. The ISP 2600 may transmit the converted digital signal to the MCP 2800.

The MCP 2800 may be a central processing unit for controlling the operation of the smart phone 2000. The MCP 2800 may include an application processor (AP).

The PMIC 2100 may be connected to the battery 2200. The PMIC 2100 may adjust the power supplied to the smart phone 2000, and may supply power to the smart phone 2000. The PMIC 2100 according to the present inventive concepts may compress and store the data used in booting. The PMIC 2100 may decompress compressed code data in a hardware manner to use the same. The PMIC 1100 according to the present embodiment may have a reduced size and a reduced operating time. Therefore, the size of the electronic device 1000 may also be reduced and a booting time of the electronic device 1000 may be shortened.

While the present inventive concepts have been particularly shown and described with reference to exemplary embodiments thereof, it will be understood by those of ordinary skill in the art that various changes in form and details may be made therein without departing from the spirit and scope of the present inventive concepts as defined by the following claims. It is therefore desired that the present embodiments be considered in all respects as illustrative and not restrictive, reference being made to the appended claims rather than the foregoing description to indicate the scope of the inventive concepts.

What is claimed is:

1. A semiconductor device comprising:
   an open loop source generator configured to generate an open loop source signal, wherein the open loop source signal is a phase signal;
   an interface configured to output a dynamic voltage source (DVS) code based on the open loop source signal used to measure latency of a closed loop circuit, wherein the DVS code is used to generate a power supply voltage;
   a monitoring unit configured to receive a power supply voltage generated based on the DVS code, and configured to generate a monitoring signal corresponding to an operating state of a system in which the semiconductor device is included; and
   a phase difference measurement unit configured to compare the open loop source signal with the monitoring signal, and to set a hold time corresponding to an arithmetic period in a closed loop based upon a difference between the open loop source signal and the monitoring signal.

2. The semiconductor device of claim 1, wherein the phase signal includes a sine wave signal, a triangle wave signal or a square wave signal.

3. The semiconductor device of claim 1, wherein the phase difference measurement unit comprises:
   a signal generator configured to generate a sliced phase signal based on the phase signal, and configured to generate a sliced monitoring signal based on the monitoring signal;
   an arithmetic unit configured to perform an arithmetic operation based on the sliced phase signal and the sliced monitoring signal; and
   a phase counter configured to measure a phase difference between the phase signal and the power supply voltage based on a result of the arithmetic operation.

4. The semiconductor device of claim 3, wherein the arithmetic operation comprises an exclusive OR (XOR) operation.

5. The semiconductor device of claim 1, wherein the monitoring unit includes a hardware performance monitor (HPM).

6. The semiconductor device of claim 1, wherein the phase difference measurement unit is configured to set the hold time before the closed loop starts.

7. A semiconductor device using a closed loop dynamic voltage and frequency scaling (DVFS), the semiconductor device comprising:
   a memory configured to store a hold time;
   a monitoring unit configured to generate a monitoring signal corresponding to an operating state of a system within which the semiconductor device is included;
   an open loop controller configured to measure a latency on a closed loop using an open loop source signal that is a phase signal that it generates, and configured to set the hold time based on the latency, which is based upon a difference between the open loop source signal and the monitoring signal; and
   a closed loop controller configured to control the closed loop,
   wherein the closed loop includes outputting a dynamic voltage source (DVS) code, receiving a first power supply voltage based on the DVS code, determining an error between the fed-back first power supply voltage and a target value for each hold time, and changing the DVS code to compensate for the error,
   the monitoring unit is configured to receive a second power supply voltage that is generated based on the phase signal, and configured to generate a monitoring signal, and
   the open loop controller is configured to compare the phase signal with the monitoring signal, and configured to set the hold time corresponding to an arithmetic period in the closed loop.

8. The semiconductor device of claim 7, wherein the open loop controller is configured to set the hold time before the closed loop starts.

9. The semiconductor device of claim 7, wherein the phase signal includes a sine wave signal, a triangle wave signal or a square wave signal.

10. The semiconductor device of claim 7, further comprising an interface configured to output the DVS code based on the open loop source.

11. The semiconductor device of claim 7, wherein the monitoring unit includes a hardware performance monitor (HPM).

12. The semiconductor device of claim 7, wherein the open loop controller comprises:
    a signal generator configured to generate a sliced phase signal based on the phase signal, and configured to generate a sliced monitoring signal based on the monitoring signal;

an arithmetic unit configured to perform an arithmetic operation based on the sliced phase signal and the sliced monitoring signal; and a phase counter configured to measure a phase difference between the phase signal and the second power supply voltage based on a result of the arithmetic operation.

13. The semiconductor device of claim 12, wherein the arithmetic operation comprises an exclusive OR (XOR) operation.

14. A semiconductor system comprising:

a power management integrated circuit configured to generate a power supply voltage; and a processor configured to generate a phase signal, and to supply to the power management integrated circuit a first dynamic voltage source (DVS) code corresponding to the phase signal, wherein the phase signal is used to measure the latency of a closed loop circuit, wherein the power management integrated circuit is configured to generate a first power supply voltage corresponding to the first DVS code, and the processor is configured to generate a monitoring signal based on the first power supply voltage, to compare the monitoring signal with the phase signal, and to set a hold time corresponding to an arithmetic period in a closed loop based upon a difference between the open loop source signal and the monitoring signal.

15. The semiconductor system of claim 14, wherein after the hold time is set, the processor is configured to output a second DVS code, to receive a second power supply voltage generated based on the second DVS code, to determine an error between the second power supply voltage and a target value for each hold time, and to change the second DVS code to compensate for the error.

16. The semiconductor system of claim 14, wherein the phase signal includes a sine wave signal, a triangle wave signal or a square wave signal.

17. The semiconductor system of claim 14, wherein the monitoring signal is generated by a hardware performance monitor (HPM) provided in the processor.

18. The semiconductor system of claim 14, wherein the processor comprises:

a signal generator configured to generate a sliced phase signal based on the phase signal and configured to generate a sliced monitoring signal based on the monitoring signal;

an arithmetic unit configured to perform an arithmetic operation based on the sliced phase signal and the sliced monitoring signal; and a phase counter configured to measure a phase difference between the phase signal and the first power supply voltage based on a result of the arithmetic operation.

19. The semiconductor system of claim 18, wherein the arithmetic operation comprises an exclusive OR (XOR) operation.

* * * * *